Dec. 21, 1954 R. V. LITTLE, JR 2,697,758
GAMMA CORRECTING CIRCUIT
Filed Aug. 1, 1950
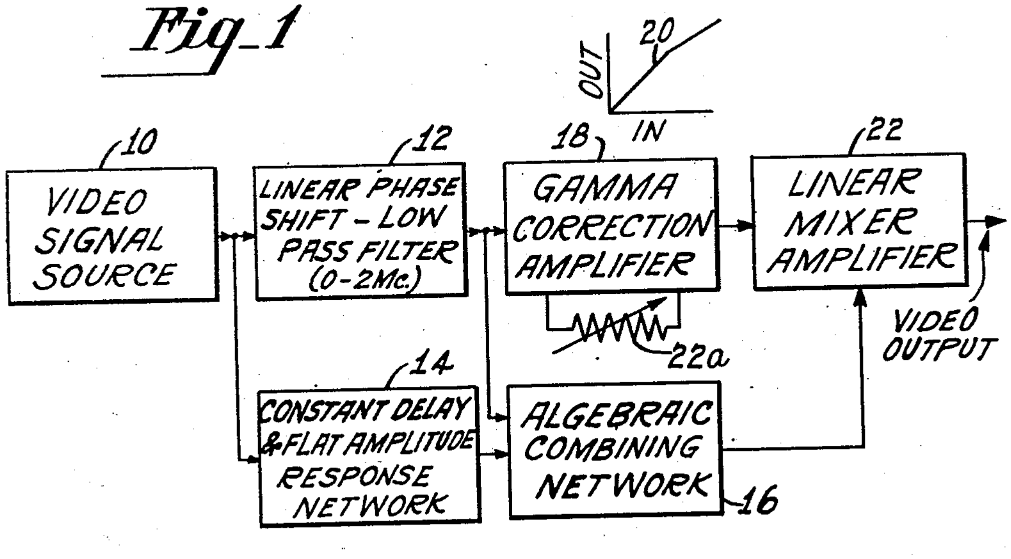
Fig_2
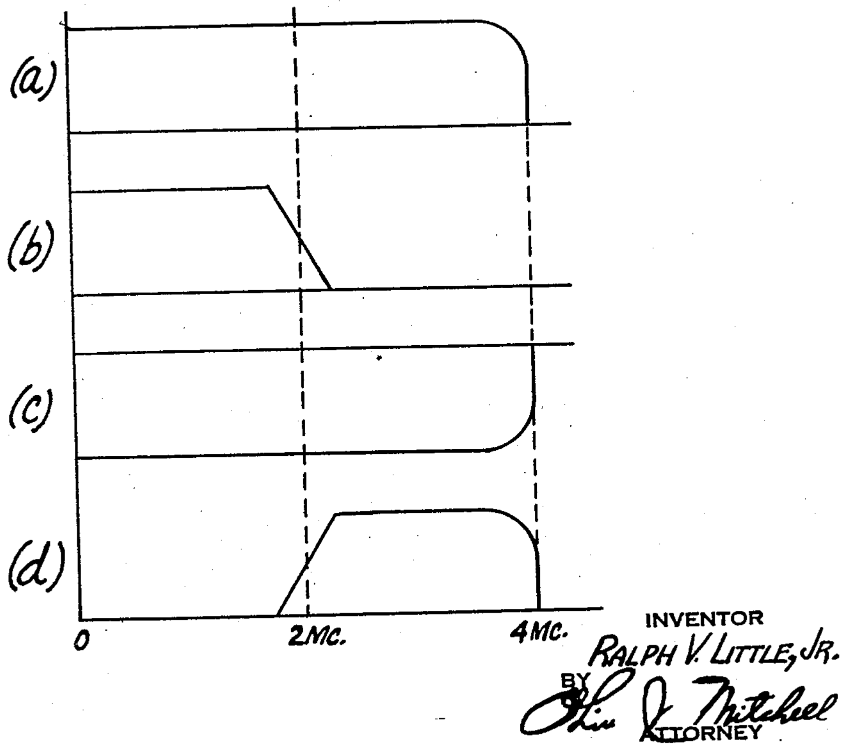
INVENTOR
RALPH V. LITTLE, JR.
BY [signature]
ATTORNEY United States Patent Office 2,697,758

Patented Dec. 21, 1954

2,697,758

GAMMA CORRECTING CIRCUIT

Ralph V. Little, Jr., Swarthmore, Pa., assignor to Radio Corporation of America, a corporation of Delaware Application August 1, 1950, Serial No. 177,096

2 Claims. (Cl. 179—171)

The present invention relates to improvements in signal processing circuits and methods, and more particularly, but not necessarily exclusively, to signal shaping circuits which selectively compress or expand predetermined amplitude ranges of an applied signal.

The present invention further relates to improvements in gamma correcting circuits for television signals.

In the electrical communications art it frequently becomes necessary to purposely distort or "shape" the wave form of electrical signals. In some instances this shaping of electrical signals is necessary to overcome or correct for distortion in the signal resulting from non-linear amplification at some point in the communication system.

The need for signal correction is perhaps no more in evidence than in the television art. As is well-known, the standard television video signal depicts brightness information on an amplitude basis. One amplitude extremity of a video signal will represent white picture information while the other amplitude extremity of the video signal will represent black picture information. Should then a video signal suffer amplitude distortion through non-linear amplification it is apparent that there would result an error in the brightness transfer characteristic of the television system. This characteristic is sometimes referred to as the gamma characteristic of the system. For example, consider a video signal in which low amplitude excursions of the video signal represent black picture information while high amplitude excursions represent white picture information. If this signal is passed through a non-linear amplifier which tends to compress low amplitude excursions of the signal, a television picture resulting from this signal will appear to have the dark grays and blacks of the picture compressed. The gamma of the resulting picture will therefor be non-linear and a certain amount of optical realism in the picture will be sacrificed.

To correct for such gamma distortion in video systems it is common in the art to utilize amplifying circuits which are purposely non-linear in such a way as to correct for the non-linearity resident in the signal. Thus if the video signal has the blacks compressed it is common to apply this signal to an amplifier circuit which will stretch low amplitude portions and thereby stretch the blacks back to their original relationship with one another.

The effect that stretching the blacks of a video signal has on the effective or apparent noise in the signal has been generally overlooked in the prior art. The first evidence of the recognition of this problem is found in U. S. patent application Serial No. 176,744, filed July 29, 1950, entitled "Signal Processing Circuits and Methods" by Vernon J. Duke. In this case it is pointed out that stretching the blacks of a video signal increases the steepness of the front edge portions of all wave form configurations falling in the black region being stretched. Any noise components in the video signal will therefor tend to become enhanced and the resulting blacks reproduced by the signal will appear gray due to the infestation of white specks corresponding to the noise. In the above referenced U. S. patent application the remedy for this artificial increase in the effective highs of the video signal was to produce a boost in the low frequency response of the gamma correction amplifier only during the reception of black picture components. Thus the highs of the resulting video signal corresponding to black picture information will be reduced and the noise effects made less troublesome.

It is an object of the present invention to provide an improved method and circuit arrangement for reducing the effects of high frequency noise increase in gamma correction amplifiers adapted to stretch black picture components.

It is a further object of the present invention to provide an improved signal processing arrangement which permits the stretching of predetermined amplitude ranges of an applied signal without producing an effective reduction in the signal-to-noise ratio of the signal.

In the realization of the above objects and features of advantage, the present invention contemplates the following technique of signal processing. First, the incoming signal is separated into low frequency and high frequency components. Secondly, non-linear amplification of the low frequency components is accomplished such that predetermined amplitude ranges of the low frequency components are stretched or expanded. Thirdly, the expanded low frequency components of the signal are linearly combined with the previously separated high frequency components of the signal. In this way the stretching of black picture components in a video signal is accomplished independently of any high frequency noise so that no effective increase in the noise component of the signal is noticeable.

A more complete understanding of the present invention, as well as other objects and features of advantage, in addition to those set forth above will become apparent through the reading of the following description especially when taken in connection with the accompanying drawing in which:

Figure 1 is a block diagram representation of the general form of the present invention, Figure 2 is a graphical presentation of certain preferred characteristics which may, by way of example, be incorporated in the embodiment of the present invention shown in Figure 1.

Turning now to Figure 1, there is indicated in block form at 10 some source of video signal. The exact nature of the signal source is of course not important to the operation of the present invention and may be a flying spot scanner, image orthicon, monoscope or the like. For purposes of describing the present invention it will be assumed that it is desired to stretch or expand the low amplitude portions of the resulting video signal.

According to the present invention the video signal appearing at the output of the source 10 is divided into high and low frequency components by any suitable means. Preferably the separation of the high and low frequency component should be accomplished in a way that will not produce a net phase shift between the high and low frequency components of the signal.

The arrangement shown in Figure 1 for accomplishing the linear phase shift separation of the low frequency components of the video signal is identical to that system shown and described in U. S. Patent No. 2,651,673, issued September 8, 1953, entitled "Frequency Discriminating Circuit" by Gordon L. Fredendall. As described in the Fredendall application the incoming signal is applied to a linear phase shift, low pass filter indicated at 12. This filter may be, by way of example, of the well known Bode type filter which exhibits a constant time delay for all signal frequencies which is the same thing as saying that the filter has a linear phase shift characteristic. Filters of the Bode type, as well as others suitable for the purpose shown in Figure 1 are described on pages 226 to 251 of the "Radio Engineers Handbook," first edition, by Frederick Terman. By way of example, the linear phase shift circuit 12 of Figure 1 is indicated as passing only frequencies from 0 to 2 mc. This upper frequency limit is of course purely exemplary. The video signal, in further accordance with the Fredendall arrangement, is also applied to the constant delay and flat amplitude response network 14. The time delay of the network 14 is made equal to that of the linear phase shift filter 12. The frequency response curve of the constant delay network 14 is indicated by way of example, in Figure 2*a*. Curve 2*b* in Figure 2 illustrates the frequency response characteristic of the linear phase shift filter 12. The output of the constant delay network 14 is then, according to Fredendall, subtractively combined with the output of the linear phase shift filter 12 by means of an algebraic combining network such as 16. The constant delay and flat amplitude network may be nothing more than a properly terminated transmission line, while the algebraic combining network 16 may be nothing more than a phase inverting amplifier followed by a resistive mixing circuit. Suitable circuit structures are shown in the above referred to Fredendall patent application, as well as in the above referenced portion of the "Radio Engineers Handbook." The curve in Figure 2*c* represents the phase inverted version of the response at 2*a* of the flat amplitude response network, while Figure 2*d* shows what remains of the output of the algebraic combining network once the curve 2*b* is subtracted from the curve 2*c*. Thus the high frequency components of the video signal will appear at the output of the algebraic combining network 16, while the low frequency components of the video signal will appear at the output of the low pass filter 12.

In further accordance with the present invention the low frequency components of the video signal are applied to the input of a gamma correction amplifier such as 18. The gamma correction amplifier may be adapted for any type correction characteristic such as shown, by way of example, by the curve 20 directly above the block 18. Symbolic resistive means at 22*a* have been indicated for varying the transfer characteristic or correction imposed by the gamma amplifier 18. A suitable gamma correction amplifier for use in the block 18 may be found disclosed by A. D. Blumlein, in U. S. Patent 2,269,001, entitled "Thermionic Valve Amplifier."

It is thus seen that only the low frequency elements of the video signal are actually gamma corrected. From the curve at 20 it will be seen that the low amplitude portions of the input signal will receive a higher amplification than the high amplitude portions. If then the polarity of the video signal as applied to the gamma correction amplifier is such that low amplitude portions thereof, relative to some datum, represent black while high amplitude portions represent white, the blacks of the signal will be stretched by the amplifier 18. Gamma correction amplifiers are well known in the art to be capable of providing any type signal compression or expansion that may be desired. The important aspect of the present invention to be noted in Figure 1 is that such gamma correction is limited to the low frequency components of the video signal.

After correction of the low frequency components by the amplifier 18 the signal is applied to a linear mixer amplifier such as is shown at 22. The linear mixer amplifier may of course be nothing more than two vacuum tube amplifiers having a common resistive load circuit. Moreover, the block 22 may be replaced by a plain resistive combining circuit having no amplification at all. In accordance with the present invention, however, also applied to an input of the mixer circuit at 22 are the high frequency components appearing, as previously described, at the output of the combining network 16. Thus the signal at the output of the mixer amplifier 22 will have had gamma correction applied only to the low frequency components of the video signal produced by the source 10 and any high frequency noise components will be effectively by-passed around the gamma correction amplifier so that no net increase in the signal-to-noise ratio of the processed signal will be obtained.

It is obvious that although the present invention has been described in connection with a video signal that the principles and circuitry peculiar to the present invention are applicable to the processing of other types of communication signals. Furthermore, it is to be understood that the present invention is in no way limited to the particular circuit arrangements suggested hereinabove for use in the block diagram representation of Figure 1. Other means than those shown may of course be used to separate the low and high frequency components of an electrical signal, and the subsequent non-linear corrective amplification of only the low frequency components and their final mixing with the high frequency components of the video signal may be accomplished by numerous circuit arrangements which will automatically suggest themselves to anyone skilled in the art after having benefited from the teaching of the present invention.

Having thus described my invention, what is claimed is:

1. In a television video signal processing system for processing a video signal waveform whose one excursion direction extremity depicts white picture information while its other excursion direction extremity depicts black picture information, the video signal waveform also containing high and low frequency components, the combination of, a signal input terminal adapted to receive input video signal, a frequency separating circuit connected with said input terminal for separating input signal into high and low frequency components, a television gamma correcting circuit of the signal expansion variety connected with said separating circuit to receive and correct low frequency video components therefrom, a linear signal combining circuit coupled with the output of said gamma correcting circuit and said frequency separating circuit for combining the corrected low frequency components with the high frequency components to form a complete corrected video signal.

2. Apparatus according to claim 1 wherein said frequency separating circuit is of the linear phase shift variety comprising the combination of a first apparatus adapted to communicate a given band of signal frequencies, said first apparatus being such to exhibit a predetermined phase shift vs. frequency characteristic over the range of signal frequencies communicated thereby, a second apparatus adapted to communicate a band of frequencies embracing at least a portion of the band communicated by said first apparatus, said second apparatus being such to exhibit phase shift vs. frequency characteristic having portions substantially the same as said first apparatus phase shift vs. frequency characteristic, and means for combining the output signals from each of said apparatus.

References Cited in the file of this patent

UNITED STATES PATENTS

| Number | Name | Date |
|---|---|---|
| 1,759,952 | McCurdy | May 27, 1930 |
| 1,902,031 | Holden | Mar. 21, 1933 |
| 2,173,925 | Tuxen | Sept. 26, 1939 |
| 2,395,159 | Albin | Feb. 19, 1946 |